J. F. JOY.
TRAILING CABLE FUSE AND HANDLE.
APPLICATION FILED JUNE 19, 1920.
1,371,310.
Patented Mar. 15, 1921.
FIG. 1.
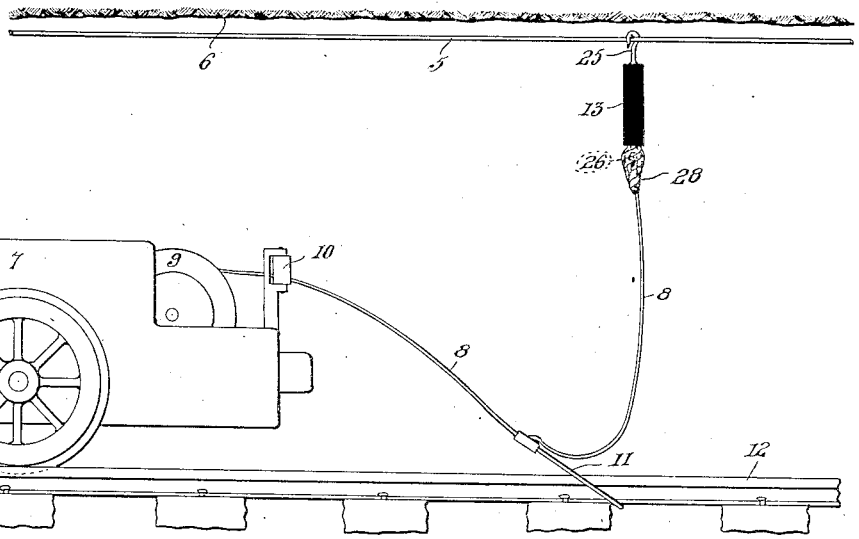
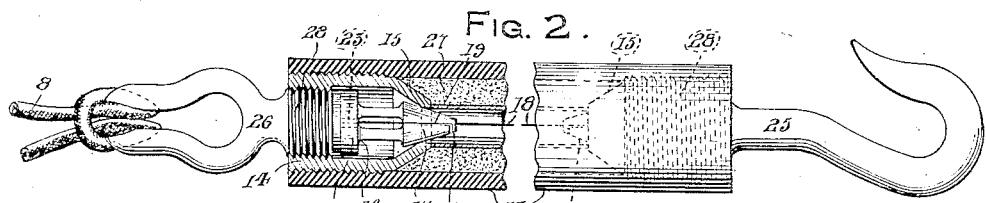
FIG. 2.
FIG. 4. 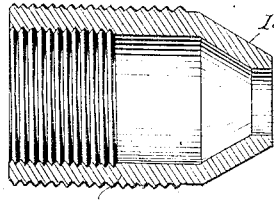 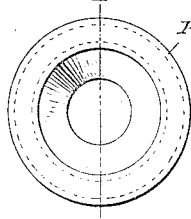 FIG. 3.
FIG. 7. 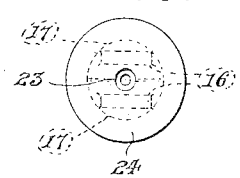 FIG. 5. 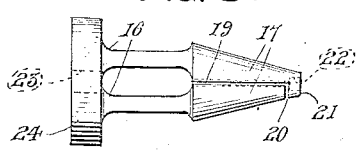 FIG. 6. 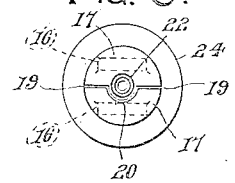
FIG. 8.
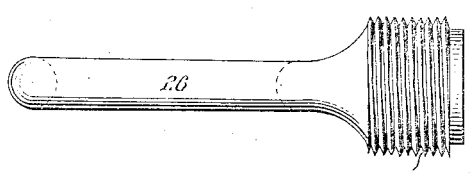
Inventor
J. F. Joy
By N. M. Wilson
Attorney

UNITED STATES PATENT OFFICE.

JOSEPH F. JOY, OF PITTSBURGH, PENNSYLVANIA.

TRAILING-CABLE FUSE AND HANDLE.

1,371,310.  Specification of Letters Patent. Patented Mar. 15, 1921.

Application filed June 19, 1920. Serial No. 390,158.

*To all whom it may concern:*

Be it known that I, JOSEPH F. JOY, a citizen of the United States of America, residing at Pittsburgh, in the county of Allegheny and State of Pennsylvania, have invented certain new and useful Improvements in Trailing-Cable Fuses and Handles, of which the following is a specification.

This invention relates to certain new and useful improvements in trailing cable fuses and handles particularly adapted for use in connection with the trailing cables of mining machinery so as to enable said trailing cables to be quickly electrically connected with or detached from the feeder wires in mines, the device embodying a handle portion which constitutes a safety fuse for preventing the motors of the mining machinery from being subjected to such high voltage as would cause burning out of the same and like detrimental effects.

In the operation of various kinds of mining machinery, especially in coal mines, the machines are provided with electric motors for their operation, and the current for these motors is generally conducted to the same through flexible conductors which are generally known as trailing cables and which are provided with means at their free ends for enabling the miner to quickly attach the same to the usual feeder wire supported near the roof of the mine entry. It is quite usual that these trailing cables be associated with a winding drum on the mining machinery so that the cable may be paid out as the machine advances in its work away from the point of connection of the trailing cable with the feeder wire. The devices at the free ends of these trailing cables at the present time are usually in the form of hooks so that the miner may engage the hook with the feeder wire, the current passing directly from the feeder wire through the trailing cable to the motor. As a result of overload and other causes, the motors or other electrical equipment of the mining machinery, are frequently subjected to such high current as to cause considerable burning out and other damage to the said motors or other electrical equipment.

It is the principal object of the present invention, therefore, to so construct the trailing cable hooks as to provide a safety handle and fuse for preventing this burning out and other damage to the electrical equipment of mining machinery.

Other objects will appear as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views, Figure 1 is a somewhat diagrammatic side elevational view of a portion of a mine entry and a mining machine with its trailing cable connected to the feeder wire by means of the present combined fuse and handle, Fig. 2 is an enlarged view, partly in elevation, partly in longitudinal section, and partly broken away, of a combined fuse and handle constructed in accordance with the present invention, Fig. 3 is an end elevational view of the cone sleeve of the device, Fig. 4 is a sectional view thereof taken substantially upon line IV—IV of Fig. 3, Fig. 5 is a side elevational view of the jaw carrying plug whose jaws are contracted by the sleeve of Figs. 3 and 4 for gripping the fuse wire, Fig. 6 is an end elevational view of the device shown in Fig. 5 looking toward the left of the latter, Fig. 7 is a view similar to Fig. 6 looking at the opposite end of the same, and Fig. 8 is an enlarged elevational view of one of the jaw actuating plugs to which the trailing cable is adapted to be connected.

In the drawing, 5 indicates the usual feeder wire which is supported in any suitable manner as usual adjacent the roof 6 of a mine entry, and from which current is adapted to be conducted to the motor of the mine machine 7 through a trailing cable 8 associated with the usual winding drum 9 and guide pulleys 10. In order to keep the trailing cable from being pulled, for various reasons, such as for preventing detachment of the trailing cable from the trolley wire, an anchor hook 11 is usually associated with the cable 8 and engaged with the rails 12 upon which the mining machine moves.

The present invention embodies a tubular handle member or casing 13 which is open and internally threaded at its opposite ends as well as formed of insulating material so as to enable a miner to grasp the same without danger.

An externally threaded cone sleeve 14 is screwed into each end of the casing 13 so that the cone-shaped ends 15 of the two sleeves are directed toward each other as shown in Fig. 2. A jaw carrying plug 16 is slid into each of the sleeves 14 so that the tapered jaws 17 of each plug are received by the cone-shaped portion 15 of one sleeve, whereby, when the plug 16 is forced inwardly, the jaws 17 are caused to contract for gripping the fuse wire 18. The plug 16 is formed preferably by the use of a single piece of material which is slit longitudinally as at 19 to provide the jaws 17 and then laterally as at 20 so as to provide a lateral end extension 21 upon one of the jaws 17 which is apertured as at 22 coincident with the slit 19 and the aperture 23 in the head 24 of said plug.

A hook member 25 is threaded into one of the sleeves 14 for forcing the plug 16 thereof inwardly so as to cause the jaws of said plug to grip one end of the fuse wire 18, the hooked end of the hook member 25 being adapted for engagement over the feeder wire 5 as shown in Fig. 1. A wedge slot connector 26 is threaded into the other sleeve 14 so as to engage the plug 16 of the latter for moving said plug inwardly and causing its jaws to grip the other end of the fuse wire 18. By the use of the wedge slot connector 26, it will be seen that the trailing cable 8 may be readily connected to the device by the formation of a slip knot in the trailing cable as shown in Fig. 2 so that said trailing cable is effectively connected against detachment from the device. If desired, the connector 26 may be wrapped with any desired insulation 28 for insuring against danger of injury by reason of the miner touching the same.

A filling of granular insulating material such as asbestos as indicated at 27 in Fig. 2 may be provided in the casing 13 around the fuse wire 18, and it will be of course understood that the fuse wire 18 is of such a nature as to be readily burned out or melted when the current in the trolley wire 5 becomes so high as to cause burning out of the mine machine motor or other electrical equipment, thereby automatically cutting out the current and thus automatically preventing this high current flowing to the motor.

The device is preferably assembled by first placing the cone sleeves 14 in position and forcing the plug of one of said sleeves inwardly into gripping engagement with one end of the fuse wire 18 by threading the hook member 25 into said sleeve. The other end of the fuse wire 18 is then preferably threaded through the other plug 16 and held by the operator while said plug is forced inwardly and the connector 26 is threaded in to cause gripping of the other end of the fuse wire, the filling 27 being placed in the casing 13 at any appropriate time.

As shown in Fig. 8, each of the members 25 and 26 includes a base 28 in the form of a threaded plug, the only difference between these two members being in the formatin of their outer portions, one as a hook, and the other as an eye or wedge slot loop.

From the foregoing description, it will be seen that I have provided an efficient trailing cable fuse and handle which will effectively prevent burning out of mining machine motors, and the fuse wires of which may be readily renewed when found necessary.

Minor changes may be made in the various parts as well as the combinations and arrangements thereof shown and described without departing from the spirit and scope of the invention as claimed.

What is claimed as new is:—

1. As a new article of manufacture, a combined trailing cable fuse and handle including means for detachable connection with a feeder wire, means for detachable connection to a trailing cable, a fuse wire connecting said two means, and a handle member supporting said two means.

2. As a new article of manufacture, a combined trailing cable fuse and handle including means for detachable connection with a feeder wire, means for detachable connection to a trailing cable, a fuse wire connecting said two means, and a handle member supporting said two means, said handle being in the form of a tubular casing having an insulating filling surrounding said fuse wire.

3. As a new article of manufacture, a combined trailing cable fuse and handle including means for detachable connection with a feeder wire, means for detachable connection to a trailing cable, a fuse wire connecting said two means, and a handle member supporting said two means, the last named means comprising a wedge slot connector.

4. In a combined trailing cable fuse and handle, a tubular open ended casing, cone sleeves threaded into the ends of said casing, a fuse wire in said casing, plugs in said sleeves having tapered jaws movable by said sleeves into gripping engagement with the ends of said fuse wire when said plugs are forced inwardly of said sleeves, and means associated with said sleeves for forcing the plugs thereof inwardly.

5. In a combined trailing cable fuse and handle, a tubular open ended casing, cone sleeves threaded into the ends of said casing, a fuse wire in said casing, plugs in said sleeves having tapered jaws movable by said sleeves into gripping engagement with the ends of said fuse wire when said plugs are forced inwardly of said sleeves, and means associated with said sleeves for forcing the plugs thereof inwardly, said last named means including a hook member adapted for detachable connection with a feeder wire.

6. In a combined trailing cable fuse and handle, a tubular open ended casing, cone sleeves threaded into the ends of said casing, a fuse wire in said casing, plugs in said sleeves having tapered jaws movable by said sleeves into gripping engagement with the ends of said fuse wire when said plugs are forced inwardly of said sleeves, and means associated with said sleeves for forcing the plugs thereof inwardly, said last named means including a wedge slot connector for attachment to a mining machine trailing cable.

7. In a combined trailing cable fuse and handle, a tubular open ended casing, cone sleeves threaded into the ends of said casing, a fuse wire in said casing, plugs in said sleeves having tapered jaws movable by said sleeves into gripping engagement with the ends of said fuse wire when said plugs are forced inwardly of said sleeves, and means associated with said sleeves for forcing the plugs thereof inwardly, said last named means including a hook member adapted for detachable connection with a feeder wire, and a wedge slot connector for attachment to a mining machine trailing cable.

In testimony whereof I affix my signature.

JOSEPH F. JOY.